Patented Nov. 24, 1925.

1,562,480

UNITED STATES PATENT OFFICE.

GUSTAV WIETZEL AND RUDOLF WIETZEL, OF LUDWIGSHAFEN-ON-THE-RHINE, GERMANY, ASSIGNORS TO BADISCHE ANILIN- & SODA-FABRIK, OF LUDWIGSHAFEN-ON-THE-RHINE, GERMANY, A CORPORATION OF GERMANY.

SYNTHESIZING HIGHER MOLECULAR ORGANIC COMPOUNDS CONTAINING OXYGEN.

No Drawing. Application filed February 25, 1925. Serial No. 11,557.

*To all whom it may concern:*

Be it known that we, GUSTAV WIETZEL and RUDOLF WIETZEL, citizens of the German Empire, residing at Ludwigshafen-on-the-Rhine, Germany, have invented new and useful Improvements in Synthesizing Higher Molecular Organic Compounds Containing Oxygen, of which the following is a specification.

It is known that oxids of carbon, by reacting with hydrogen under the influence of catalysts, can be reduced to methanol and oxygenated organic compounds of a higher order.

We have found that valuable organic compounds can also be synthesized by acting on aliphatic alcohols in a vaporized condition with carbon monoxid at an elevated temperature and in the presence of caltalysts. Elevated pressure may also be employed with the advantage of increasing the speed of the reaction, but the reaction may also be carried out at ordinary pressure.

Various catalytic masses may be employed and very suitable are such masses containing both hydrogenating and hydrating constituents, and as examples of hydrogenating constituents, copper, silver, gold, tin, lead, antimony, bismuth, zinc, cadmium and thallium may be cited, or oxids of the aforesaid or other elements, and as instances of hydrating constituents we mention oxids of titanium, zirconium, thorium, vanadium, niobium, manganese, cerium, lanthanum, tantalum, chromium, molybdenum, tungsten uranium, didymium, glucinium, aluminium and others. Iron, nickel and cobalt are also suitable provided they are used in a combined (whether chemically or physically) condition. An addition of alkali, or earth alkali, metal compounds is sometimes helpful in increasing the efficiency of the contact masses also an addition of ammonia to the carbon monoxid exerts a catalytical effect. The nature of the products varies, to some degree, in accordance with the special catalyst actually used and with the temperature of the reaction. Generally the higher the temperature, and the longer the vapors are exposed to the contact mass, the higher the boiling point of the products obtained.

For example, when methanol vapor and carbon monoxid are passed over a contact mass containing oxids of iron and manganese at a temperature of about 400 degrees Centrigrade and an elevated pressure, a product containing several acids, particularly butyric and valeric acid, free or combined, is obtained.

Other gases for example hydrogen, or nitrogen may also be present in addition to carbon monoxid. In some such cases, products containing nitrogen will be formed.

The process can, if desired, be carried out in a circulating system, or with several contact vessels, the products formed being separated after each treatment and the residual gases returned into the original catalytic vessel or into one or more subsequent catalytic vessels after replenishing the gases consumed by the reaction. The cooler for separating the products may be kept at a suitable temperature to effect only condensation of higher boiling products, leaving for example methanol and other materials of low boiling point in a vapor state, and several coolers, or receivers, kept at several different temperatures may be arranged to effect direct separation into distinct fractions.

It is not necessary to employ, for the process of our invention, separated alcohols. For example, the methanol-carrying gas mixtures obtained by catalytic treatment of gases containing carbon oxids and hydrogen may be directly employed, if required, while adding carbon monoxid or hydrogen or mixtures of both.

Instead of methanol, methyl formate, or a mixture of methanol and methyl formate, or other esters, or mixtures of esters, and alcohols may be employed. Aldehydes may also be employed, when hydrogen is present, instead of alcohols.

The following examples will serve to further illustrate the invention and some manners of carrying it into practice, but it is not intended to limit the invention by these examples.

*Example 1.*

A mixture of methanol vapor and carbon monoxid is passed, at a pressure of 200 atmospheres and at 420 degrees centigrade, over a contact mass containing alkali, chromium, and molybdenum. On cooling the reaction gases, a product is separated which contains higher alcohols, aldehydes, and several aliphatic acids in the form of esters. The temperature of the reaction may be varied, the products possessing generally higher boiling points when obtained at higher temperatures.

*Example 2.*

A mixture of ethyl alcohol and carbon monoxid, free from iron carbonyl, is passed, at 400 degrees centigrade and 200 atmospheres, over a catalyst containing an intimate mixture of the oxides of zinc, chronium and manganese and placed in a tube, capable of resisting high pressure, and lined with copper. On cooling, oxygenated products are obtained in ample quantities, for the minor part boiling below ethyl alcohol, chiefly, however, at from 100 degrees to 250 degrees centigrade and higher. Various higher aldehydes, acids and esters thereof are contained in the product, besides ethyl alcohol and higher alcohols and water.

A mixture of methanol and ethanol may also be employed.

*Example 3.*

A mixture composed of 7 per cent, by volume, of methanol vapor, 20 per cent of carbon monoxid, 70 per cent of hydrogen and 3 per cent of nitrogen is passed, at about 450 degrees centigrade and 200 atmospheres over a contact mass containing oxids of potassium, chronium and zinc. Ample quartities of oxygenated organic compounds of a higher molecular nature, both soluble and insoluble in water, are produced. Isobutanol, normal propanol, amyl and higher alcohols and about 10 per cent of free and combined acids are found therein.

The gaseous mixture mentioned may be obtained by passing a mixture of hydrogen, carbon monoxid and a little nitrogen through methanol, kept at say 160 degrees centigrade, or through a device down which methanol trickles, or the alcohol may be sprayed into the reaction vessel.

*Example 4.*

Methanol is heated to about 300 degrees centigrade together with a mixture of carbon monoxid and 10 per cent of ammonia at a total pressure of 800 atmospheres. The product contains higher molecular oxygenated organic compounds and ammonium salts of organic acids and other compounds containing nitrogen or both nitrogen and oxygen.

*Example 5.*

A gas mixture containing 12 per cent of methyl formate vapor, 35 per cent of carbon monoxid, 50 per cent of hydrogen and 3 per cent of methane is passed, at 400 degrees centigrade and 220 atmospheres, over a contact mass prepared by mixing 2 parts of wetted potassium permanganate with 1 part of zinc chromate and 1 part of copper chromate. Ample quantities of a product resembling that of Example 3, but with a higher percentage of free and combined acids is obtained.

*Example 6.*

A tube-shaped reaction vessel, capable of resisting high pressure is supplied with catalyst grains, consisting of 5 parts, by weight, of cadmium oxid, 2 parts, by weight, of copper oxid, and 2 parts of vanadic acid, and a gas mixture composed of 3 volumes of hydrogen and 1 volume of carbon monoxid is then passed through, at 500 degrees centigrade and a pressure of 200 atmospheres. The gases leaving the catalyst, containing methanol vapors and unaltered hydrogen and carbon monoxid, are passed, while still hot, through a second contact tube directly adjoining the first one, which is kept at the same temperature, and filled with a contact mass, prepared from 2 parts, by weight, of caustic potash, 2 parts of thallium oxid, and 3 parts of potassium permanganate. Under the influence of this second contact mass, the methanol vapors are, to a considerable extent, transformed into higher molecular compounds, for example isobutanol. The two contact masses may also be brought into one contact tube in the order named.

The composition of the products varies depending on the temperature, pressure and composition of the gas mixture. With a high percentage of carbon monoxid ample quantities of organic acids, free or in the form of esters, are formed.

*Example 7.*

Water gas, freed from sulfur compounds and from iron carbonyl, is passed with an admixture of 5 per cent, by volume, of vaporized ethyl alcohol of 96 per cent at between 380 degrees and 400 degrees centigrade and 200 atmospheres, over a contact mass prepared by mixing 2 parts of potassium carbonate, 4 parts of zinc chromate and 1 part of copper oxid. The product obtained is chiefly composed of liquid organic compounds, insoluble in water. When an addition of methyl, or ethyl, formate is made, the yield of said compound is increased. Instead of mixing the ethyl alcohol vapors with the water gas before passing it over the catalyst, the addition of alcohol vapors may be effected at several subsequent places distributed over the length of the contact mass.

We claim:

1. The process of synthesizing higher molecular organic compounds containing oxygen which consists in causing carbon monoxid to act on a vaporized aliphatic alcohol with the aid of a catalyst and at an elevated temperature and pressure.

2. The process of producing higher molecular organic compounds containing oxygen which consists in exposing a gas containing carbon monoxid and a vaporized aliphatic alcohol to the action of a catalyst at an elevated temperature and pressure.

3. The process of producing higher molecular organic compounds containing oxygen which consists in causing carbon monoxid to react with an aliphatic alcohol in the form of an ester and in a vaporized state, at an elevated temperature and pressure, and in the presence of a catalyst.

4. The process of producing higher molecular organic compounds containing oxygen which consists in causing carbon monoxid to react with a vaporized aliphatic alcohol both in the free state and in the form of an ester, at an elevated temperature and pressure and in the presence of a catalyst.

5. The process of producing higher molecular organic compounds containing oxygen which consists in subjecting a mixture of an oxid of carbon with hydrogen, at an elevated temperature and pressure, to the action of a methanol-forming catalyst and exposing the reaction gases containing methanol without separating the latter from the gases to a second catalytic treatment in the presence of carbon monoxid and cooling the reaction gases.

6. The process of synthesizing higher molecular organic compounds containing oxygen which consists in causing carbon monoxid to react with an aliphatic alcohol in a vaporized state, at an elevated temperature and pressure, and in the presence of a contact mass comprising a hydrogenating and a hydrating constituent.

7. The process of producing higher molecular organic compounds containing oxygen which consists in catalyzing a gas containing carbon monoxid and hydrogen with a vaporized aliphatic alcohol at an elevated temperature and pressure.

8. The process of synthesizing higher molecular organic compounds containing oxygen which consists in causing carbon monoxid and hydrogen to react with aliphatic alcohol in a vaporized state, at an elevated temperature and pressure, and in the presence of a contact mass comprising a hydrogenating and a hydrating constituent.

In testimony whereof we have hereunto set our hands.

GUSTAV WIETZEL.
RUDOLF WIETZEL.